United States Patent [19]

Chen

[11] Patent Number: 5,588,930
[45] Date of Patent: Dec. 31, 1996

[54] TWO-SPEED GEARBOX

[75] Inventor: Li-Yu Chen, Hsinchu, Taiwan

[73] Assignee: Industrial Technology Research Institute, Hsinchu, Taiwan

[21] Appl. No.: 407,566

[22] Filed: Mar. 21, 1995

[51] Int. Cl.⁶ .................................................. F16H 3/44
[52] U.S. Cl. .......................................................... 475/300
[58] Field of Search ...................................... 475/298, 300

[56]     References Cited

U.S. PATENT DOCUMENTS

| | | | |
|---|---|---|---|
| 1,777,997 | 10/1930 | Wise | 475/300 |
| 2,464,890 | 3/1949 | Premo | 475/300 |
| 2,968,189 | 1/1961 | Walko | 475/300 |
| 2,985,037 | 5/1961 | Schoenle et al. | 475/300 |
| 4,932,281 | 6/1990 | Ordo | 475/300 |
| 4,995,861 | 2/1991 | Erlbruch | 475/300 |

Primary Examiner—Dirk Wright
Attorney, Agent, or Firm—W. Wayne Liauh

[57]     ABSTRACT

A two-speed gearbox, having an input shaft which is connected to a spline shaft, when the gearbox is in direct drive, a front part of the spline shaft is in engagement with a shaft coupler which drives an output shaft to transmit a 1:1 ratio; when the gearbox is geared down, the spline shaft is moved such that its front part is separated from the shaft coupler and engaged with a sun gear of the planetary gear train within a housing which makes the internal splines of a frame of the planetary gear engage with external splines of the shaft coupler. Power is transmitted from the spline shaft, through the speed reduction of the sun and planetary gear train and to the planetary gear frame, and then is transmitted to the shaft coupler and sent out through the output shaft.

1 Claim, 10 Drawing Sheets

TWO-SPEED GEARBOX

BACKGROUND OF THE INVENTION

1. Field of the Invention

The present invention is related to a kind of two-speed gearbox, particularly indicated to possess a simple structure to resolve the heat efficiency loss problem due to the temperature rise when it is in direct transmission.

As shown in FIG. 1, the traditional planetary two-speed gearbox makes use of the action of controlling the internal gear to attain the object of two-speed shift. In the planetary gear train with sun gear as the input shaft and planetary gear frame as the output shaft, the transmission is the one with the ratio of speed reduction equaling 1 when the internal gear rotates synchronously with the planetary gear frame. The gear shift is actually making use of the on-and-off motion of the splines. The inventor found this kind of on-and-off motion to be very smooth and applicable for use as a motion mode to improve the gearbox.

The control of temperature rise is the principal task on the demand of high speed performance. The temperature of the speed reducer should not be over 30 degrees. Otherwise, fans should he used to enhance the circulation as well as the heat dissipation. Even a cooling circulation system should be used, but often the additional cost exceeds the cost of the speed reducer itself. The way to improve a two-speed gearbox is to design a mechanism that can lower the heat efficiency loss. According to a testing for a traditional planetary two-speed gearbox performing an idling rotation, it is found that the efficiency loss resulted from the high speed is much greater than that of the two-speed precision gear (by 2–3%). At high gear, direct transmission with a ratio of 1:1, the usage occasion tends to be at high speed of 8000–2000 RPM, and the temperature rise is very high, disregarding the magnitude of the loading. At the low gear with a reduction ratio of 4:1, the usage occasion tends to be at low speed, the temperature rise is rather low at the idling rotation, and the idling temperature is stably ups and downs depending upon the magnitude of the loading. Referring to Table 1, for the same speed (6300 RPM), the temperature rise, when it is gearing down, is less than one half of the temperature rise when it is in direct transmission. Inasmuch, the high temperature rise at the ratio 1:1 is mainly due to the oil stirring. The oil stirring loss depends on the width and surface velocity of the stirrer. As shown in FIG. 1, the outside diameter of the stirrer is that of the internal gear. The stirring velocity is proportional to the outside diameter, thereby, the internal gear rotation with large outside diameter is unfavorable to the design of temperature rise.

TABLE 1

The results of performing an efficiency analysis of the prior art's product

| Speed (RPM) | 6,300 | 6,300 | 1,500 | 1,500 |
|---|---|---|---|---|
| Shift | 1:1 | 4:1 | 1:1 | 4:1 |
| Idle Temp. Rise | 50° C. | 23° C. | 19° C. | 9° C. |
| Idle Loss | 0.2 HP | 0.09 HP | 0.075 HP | 0.034 HP |
| Loss Efficiency (5 HP) | 4% | 1.8% | 1.5% | 0.068% |
| Loss Efficiency (10 HP) | 2% | 0.9% | 0.75% | 0.34% |

Note 1:
In general, in direct transmission with a ratio of 1:1, one tends to use at speed 8,000–9,000 RPM. At the gearing down, one tends to use at low speed. As shown in Table 1, the efficiency loss (which is independent of loading) that resulted from the prior art's product at high speed operation is far greater than 3% (under rated loading), while the efficiency loss of the general gear and bearing is within 3% under the present loading. Inasmuch, the prior art's product is very unfavorable at high speed operation.

TABLE 1-continued

The results of performing an efficiency analysis of the prior art's product

Note 2:
To calculate the heat dissipation according to the temperature rise, the formula is as follows:
WF = ΔT * 35 * A
Where WF = heat dissipation (ft-lb/min.)
ΔT = temperature rise (°F.)
A = heat dissipation area (sg. ft)
(the heat dissipation area exposed to the air is counted as 2 sg. ft)

The stirring loss, under the conditions with the same width and speed, is proportional to the outside diameter of the stirrer. One can attain the object of lowering the stirring loss by reducing the outside diameter of the stirrer.

(The stirring loss of traditional direct transmission): (The stirring loss of present invention's direct transmission)=4:1

* The outside diameter of the traditional stirrer is at the internal gear.
* The outside diameter of the present invention's stirrer is at the spline shaft.

SUMMARY OF THE INVENTION

The objective of the present invention is to provide a kind of two-speed gearbox which is the modified structure of the traditional two-speed gearbox. It can lower the heat loss to satisfy the required system performance. The way the traditional planetary two-speed gearbox attains object of two-speed shift is to manipulate the action of the internal gear, but this action will escalate the lubrication oil's stirring effect and increase the efficiency loss. Moreover, the heat generated is unfavorable to the position precision of the precision machinery. The present invention changes the design of synchronizing rotation of the internal gear and sun gear of the planetary gear train by having the power input connect directly to the planetary speed reduction mechanism and then connect to the output shaft so as to reduce the stirring loss and improve the precision problems resulted from the heat loss.

BRIEF DESCRIPTION OF THE DRAWINGS

To further understand the features and the technical contents of the present invention, please refer to the detailed description and the accompanied drawings. Although the present invention has been illustrated and described by the drawings with reference to the preferred embodiments thereof, it should be appreciated that it is in no intention of limiting the scope of the present invention.

DETAILED DESCRIPTION OF THE INVENTION

Figure 1:
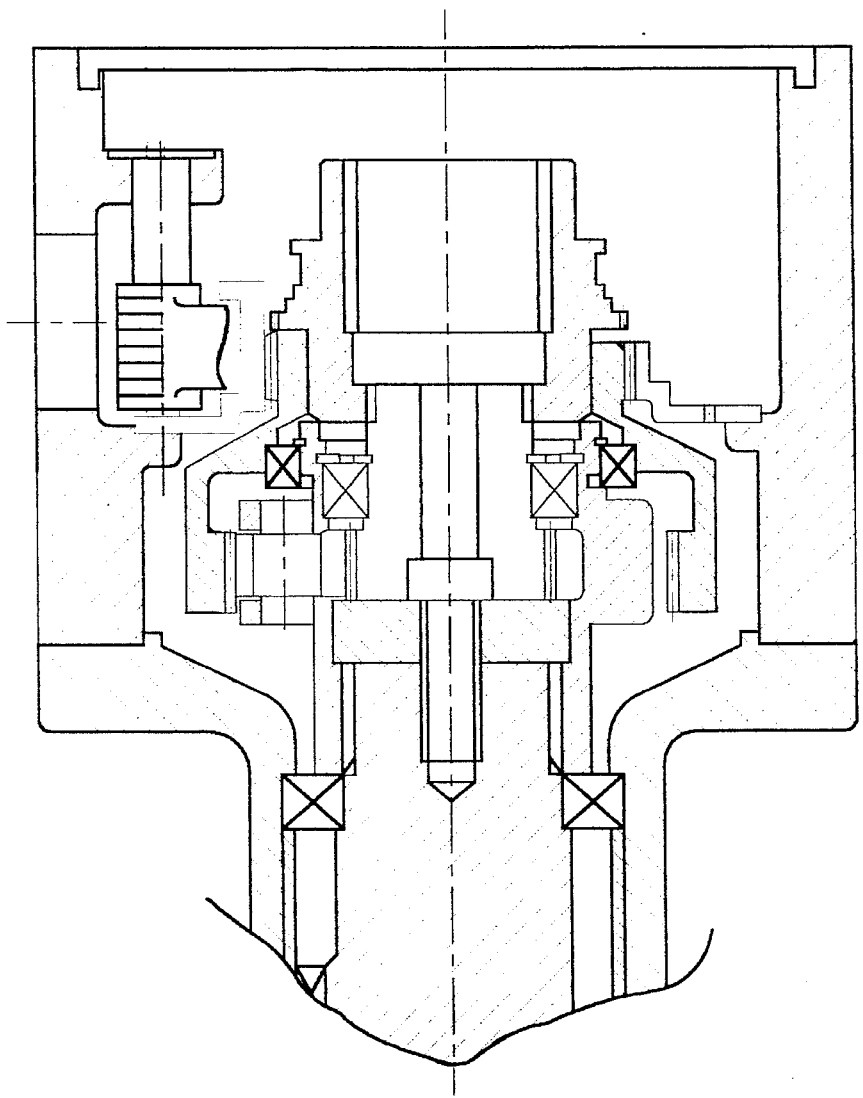
FIG. 1 is the cross-section view of the prior art.
Figure 2:
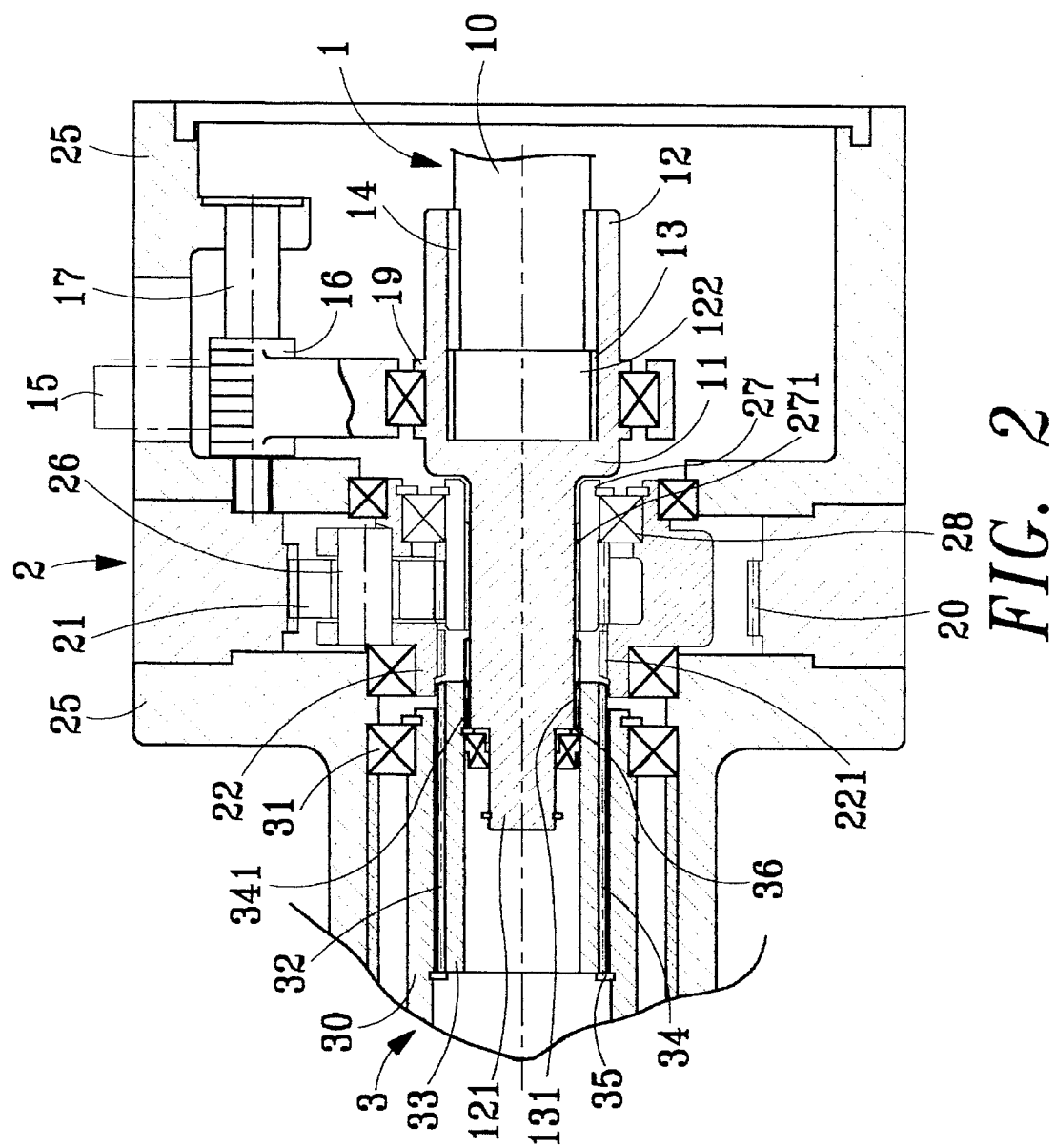
FIG. 2 is the cross-section view in direct transmission of the present invention's first embodiment.
Figure 3:
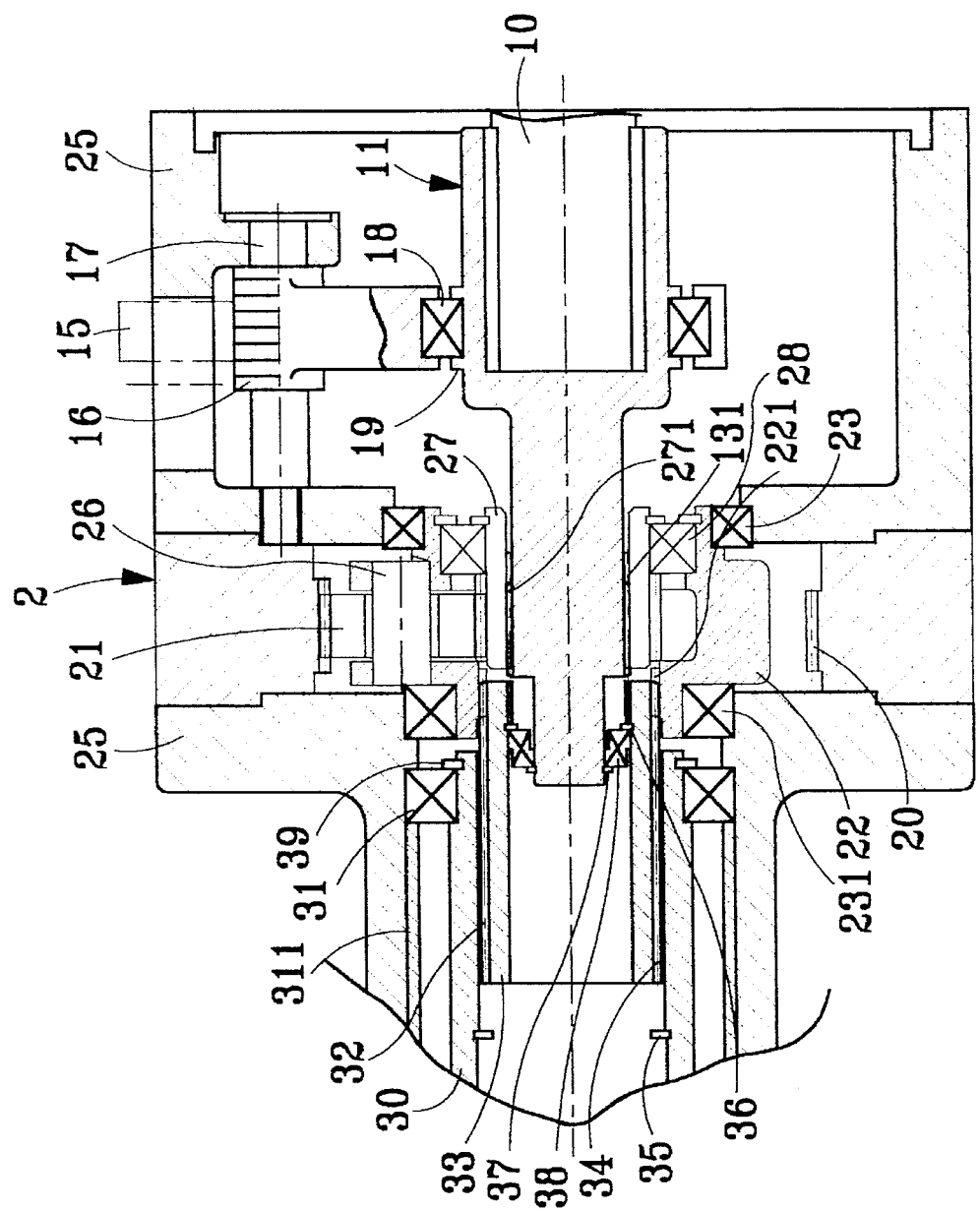
FIG. 3 is the cross-section view in gearing down of the present invention's first embodiment.

As shown in FIG. 2 and FIG. 3, a kind of two-speed gearbox of the first embodiment of the present invention possesses a housing 25. It contains three major parts. They are input part 1, speed reduction part 2, and output part 3 respectively.

The input part 1 comprises an input shaft 10 which is connected to the motor shaft, and the spline shaft 11, which is at the front part of the input shaft 10, can slide axially and rotate together with the input shaft 10. The spline shaft 11 is in charge of the power transmission. As shown in the drawings, the fight end of the spline shaft 11 is the thick end 12, inside is the hollow part 122, which is provided with internal splines 13. The spline shaft 11 is provided with external splines 131, the internal spline 13 is in engagement with the outer splines 14 of the input shaft 10.

In addition, there is a gear shift mechanism which is equipped with a gear shift lever 15 inserted into the housing 25 at the outside surface of the thick end 12 of the spline shaft 11, the gear shift lever 15 drives a slider 16 to slide on a stationary gear shift rod 17. The bottom end of the slider 16 is connected to the fixed part 19 at the outside surface of the spline shaft 11 by the use of a bearing 18 so as to drive the spline shaft 11 to slide in axial direction.

The speed reduction part 2 comprises an annular gear 20, planetary gears 21, a planetary gear frame 22 and sun gears 27. The planetary gear frame 22 is positioned to the housing 25 by use of a pair of bearings 23 and 231, the planetary gear 21 is positioned to the planetary gear frame 22 through its planetary fixed shaft 26, the sun gear 27 is positioned to the planetary gear frame 22 by a bearing 28; the inner surface of the planetary gear frame 22 is provided with internal splines 221; the inner surface of the sun gear 27 is provided with internal splines 271.

The output part 3 comprises an output shaft 30 which is fixed to the housing 25 by use of a bearing 31 and using a position limitator 39, the bearing 31 is positioned by use of a bearing sleeve 311, the output shaft 30 is provided with internal splines 32 which is in engagement with the external splines 34 of a shaft coupler 33 and is able to rotate synchronously. In this way, the power is transmitted from the shaft coupler 33 to the output shaft 30.

Figure 4:
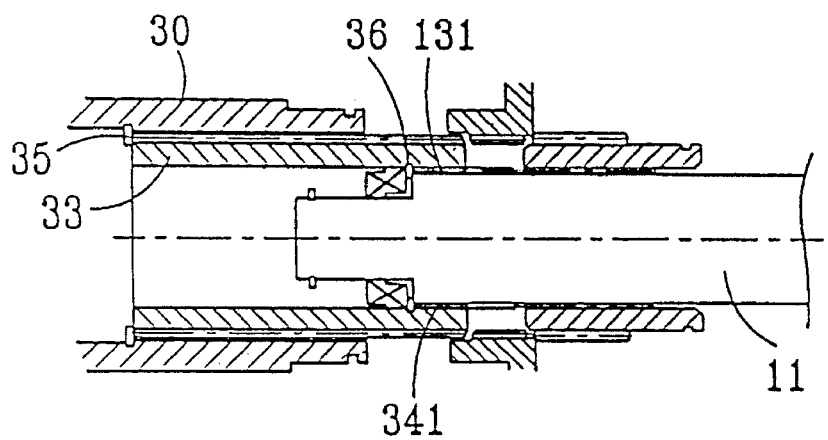
FIG. 4 is the cross-section view of the related structure in direct transmission of the present invention's first embodiment.
Figure 5:
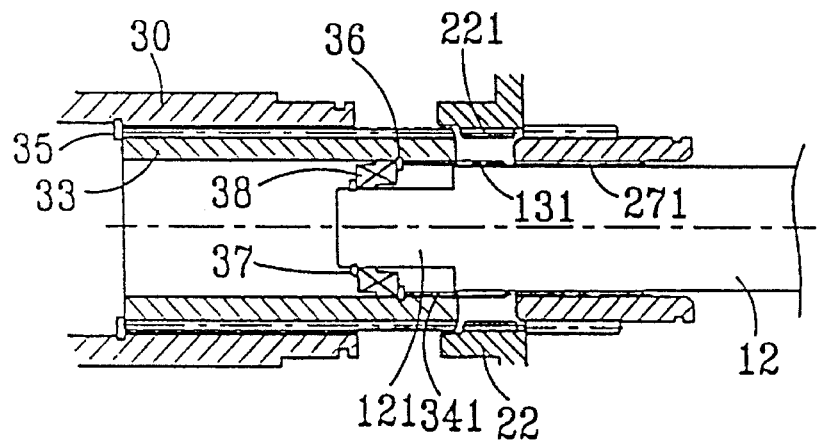
FIG. 5 is the cross-section view of the related structure in idling of the present invention's first embodiment.
Figure 6:
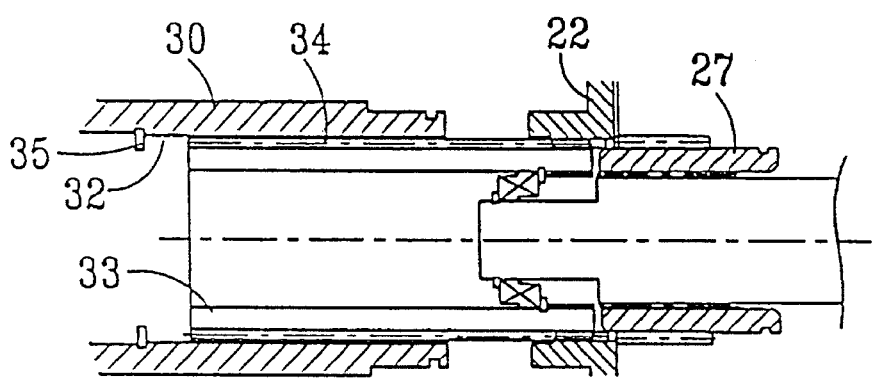
FIG. 6 is the cross-section view of the related structure in gearing down of the present invention's first embodiment.

The shaft coupler 33 is controlled by the spline shaft 11 inside the output shaft 30 to change positions in axial direction. As shown in FIG. 4 through FIG. 6, there are three related positions between spline shaft 11 and shaft coupler 33. When the shalt coupler 33 is in engagement with spline shaft 11, it is in the direct transmission with ratio 1:1 as shown in FIG. 4, see also in FIG. 2. When the shaft coupler 33 is neither in engagement with the spline shaft 11 nor in engagement with the planetary gear frame 22, it is in the idle situation in the middle position as shown in FIG. 5. When the shaft coupler 33 is in engagement with the planetary gear frame 22, it is in the gearing down state with ratio 4:1 as shown in FIG. 6, see also in FIG. 3.

When it is in direct transmission as shown in FIG. 2, the spline shaft 11, being pushed by the gear shift mechanism toward the output direction while still meshed with the input shalt 10, pushes the shaft coupler 33 until it hits one of the position limitators 35 which is located at shaft 30, and the shoulder, where the thick end 12 and thin end 121 of the surface of the spline shaft 11 meet, hits one of the position limitators 36 equipped in the shaft coupler 33. When the external splines 131, equipped at the thin end 121 of the spline shaft 11, is in engagement with the internal splines 341 equipped at the right end of the shaft coupler 33, the spline shaft 11 is in engagement with the shaft coupler 33 at its thin end 121. Thereby, by use of the shaft coupler 33, it drives the output shalt 30 in direct transmission at a ratio of 1:1.

When it is gearing down as shown in FIG. 3, the spline shaft 11, being pushed toward the power input's motor direction by the gear shift lever 15 and with it's front end separated away from the shaft coupler 33 and by the position limitator 37 at the left end of the spline shaft 11 to pull the bearing 38 until it hits the position limitator 36, drives the shaft coupler 33 to move toward the power input's motor direction and causes the splines 131 of the spline shaft 11 mesh into the internal spline 271 of the planetary gear train's sun gear 27 which is equipped within the housing 25 and also makes the internal splines 221 of the planetary gear frame 22 mesh with the external splines 34 of the other end of the shaft coupler 33. After finishing the meshing actions, power is transmitted from the spline shaft 11 to splines 131, then to the internal spline 271. Thereafter, through the speed reduction of the sun gear 27 and planetary gear 21 as well as annular gear 20, power is further transmitted toward the planetary gear frame 22, through the internal splines 221 of the frame 22 toward the external splines 34 of the shaft coupler 33, then to the shaft coupler 33, through the external spline 34 of the shaft coupler 33 to the meshed internal splines 32 of the output shaft 30, and finally transmitted outward with speed reduction through the output shaft 30.

The position limitators in the output shaft 30 and shaft coupler 33 as well as spline shaft 11 as described above can be substituted by the shoulders.

Figures 11A, 11B, 11C:
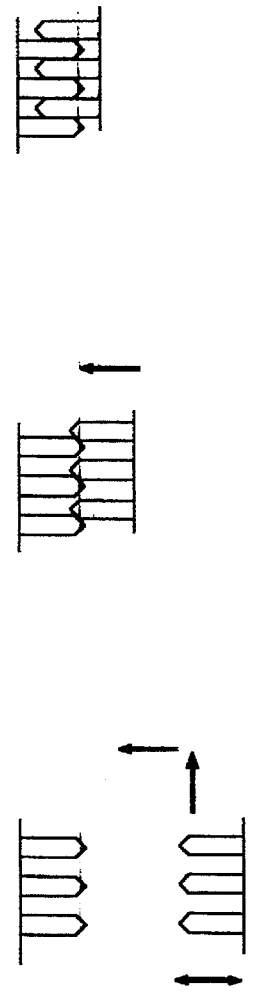
FIG. 11-A–FIG. 11-C are the developed views of the spline shaft's shift-in in clockwise direction of the present invention.
Figures 12A, 12B, 12C:
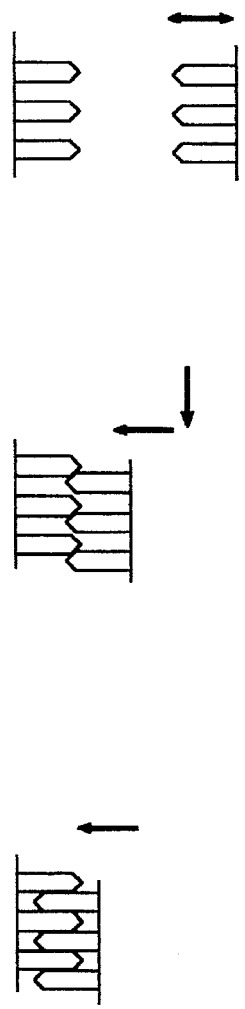
FIG. 12-A–FIG. 12-C are the developed views of the spline shaft's shift-in in counter-clockwise direction of the present invention.
Figure 13:
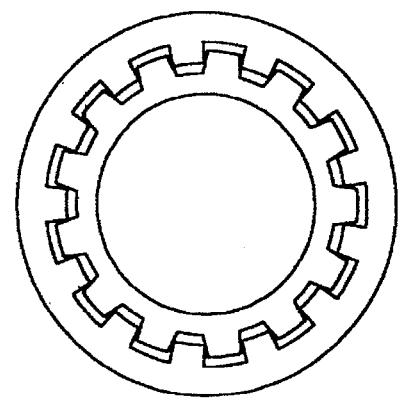
FIG. 13 is the cross-section view of the spline shaft's meshed part of the present invention.
Figure 14:
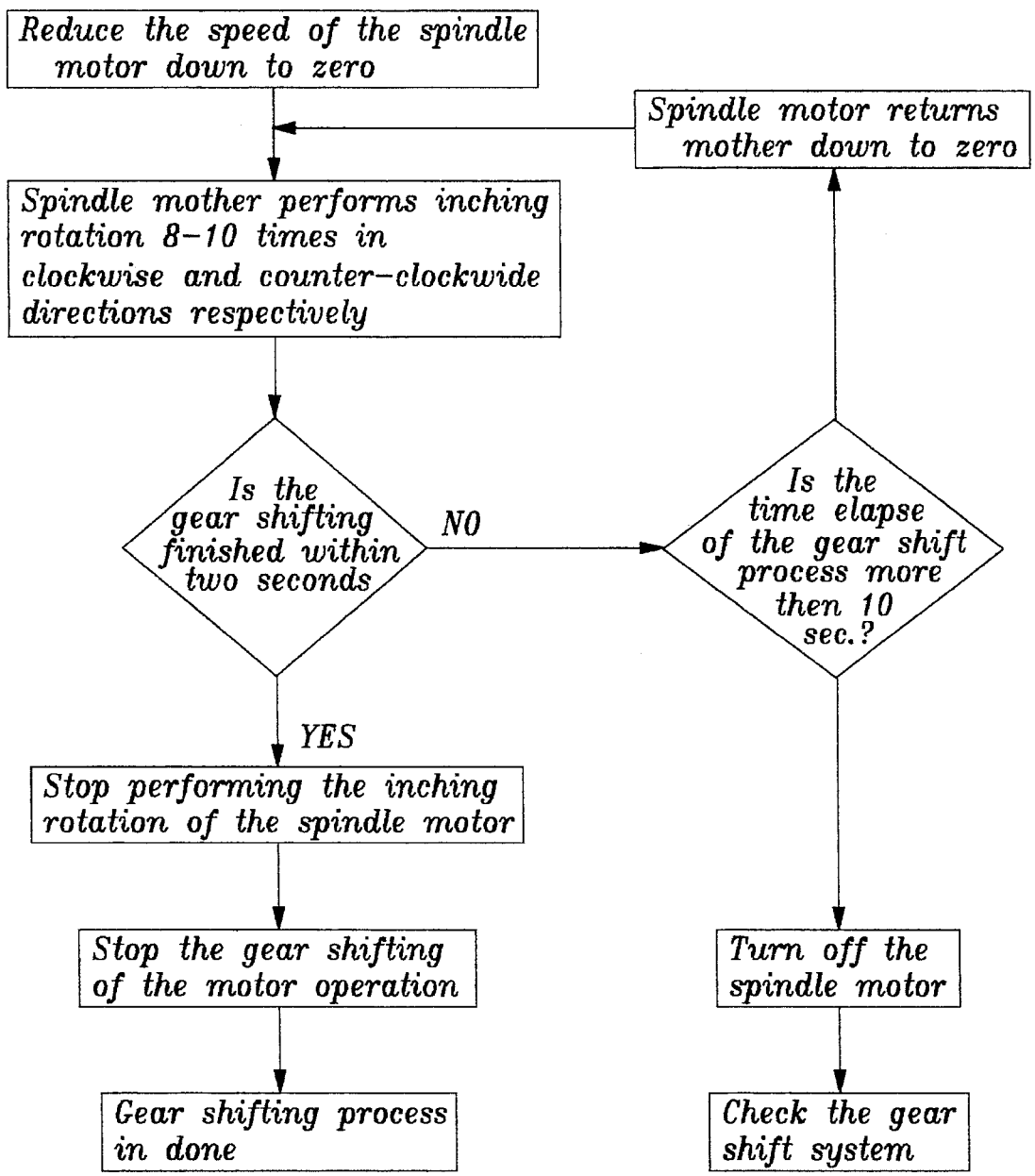
FIG. 14 is the flow-chart of the spline shaft's shift-in process of the present invention.

Among them, the actions of each pair of splines are shown in FIG. 11 through FIG. 13, and the operation procedures are shown in the flow chart in FIG. 14. From FIG. 11A through 11C is the shift-in positioning while the spline shaft rotates in the clock-wise direction until it fits in the fight position. From FIG. 12A through 12C is the shift-in positioning while the spline shaft rotates in the counter-clockwise direction until it fits in the right position. The structure of the internal and external splines is shown in FIG. 13.

Figure 7:
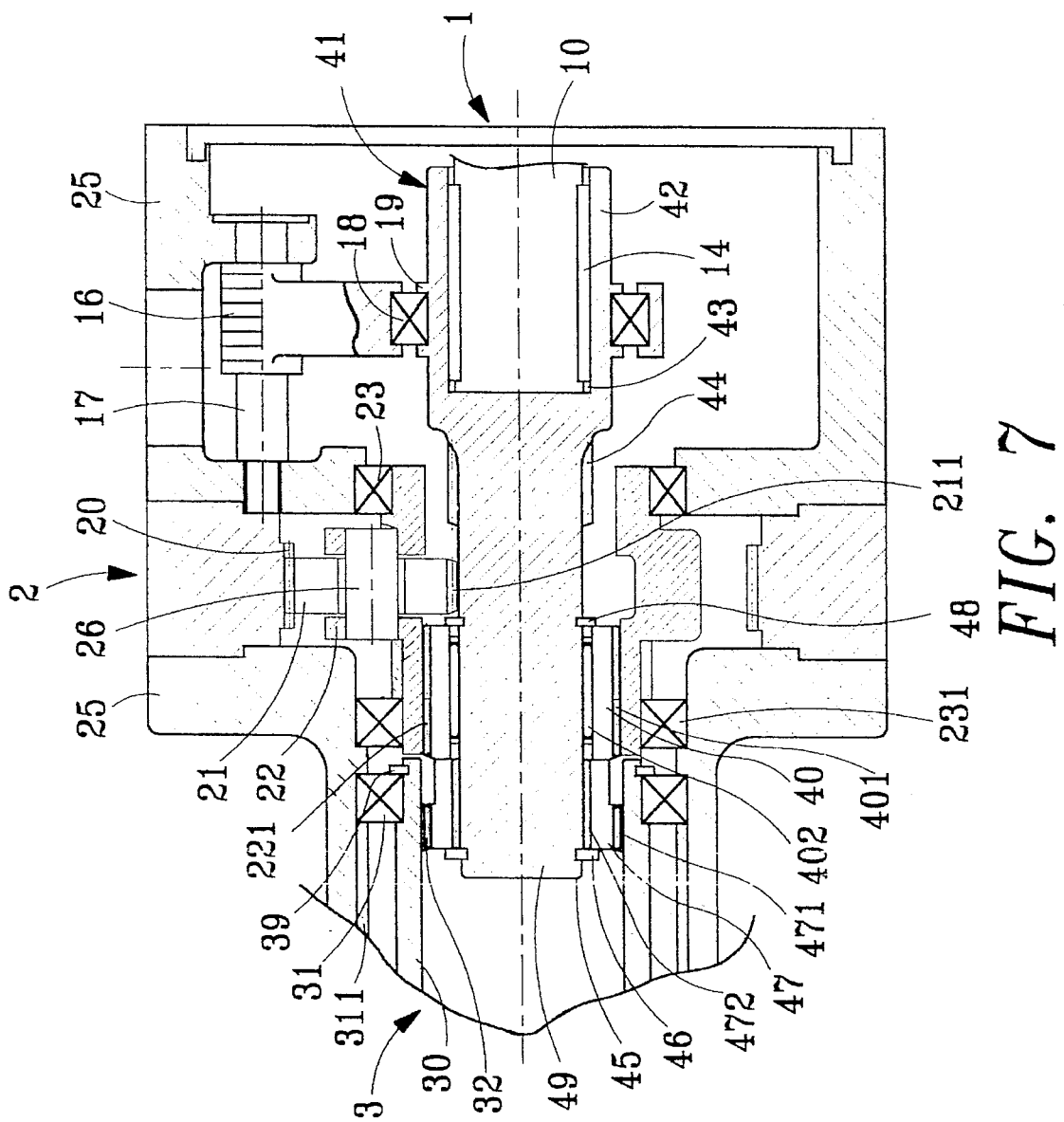
FIG. 7 is the cross-section view in direct transmission of the present invention's second embodiment.
Figure 8:
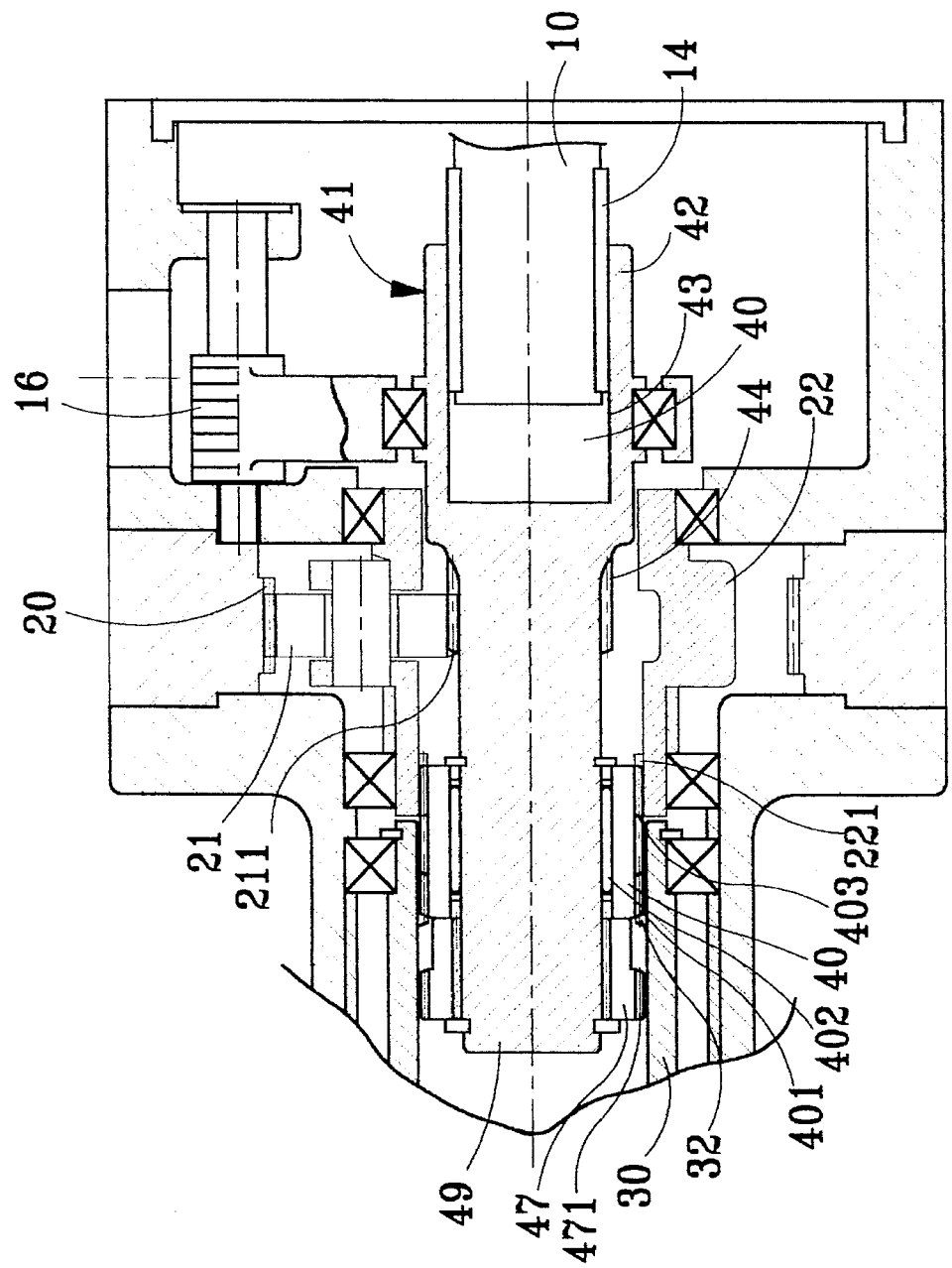
FIG. 8 is the cross-section view in gearing down of the present invention's second embodiment.

FIG. 7 and FIG. 8 are the second embodiments of the present invention in direct transmission and in gearing down respectively. As it is in the first embodiment, it is equipped with a spline shaft 41 with its right end as the thick end 42, center part being the hollow part equipped with internal splines 43 to mesh with the external splines 14 of the input shaft 10. It is also equipped with external gear 44 at the part where the thin end 49 meets the thick end 42 of the spline shaft. It is provided to be in engagement with the teeth 211 of the planetary gear 21, that is, to replace the sun gear 27's structure of the first embodiment with external gear 44 and let the sun gear 27 combined with the spline shaft 41. No shaft coupler 33 is equipped, Rather, it is equipped with a sliding sleeve 40 connected by a position limitator 48 located at the center part of the thin end 49 of the spline shaft 41. It is also equipped with a driving sleeve 47 next to the sliding sleeve 40 which is fixed to terminal 45 of the spline shaft 41's thin end 49 by the position limitator 46 such that the driving sleeve won't be able to come off. Also, the driving sleeve 47 is equipped with splines 471 on its surface which will mesh with internal spline 32 of the output shaft 30 when it is in direct transmission from spline shaft 41 to output shaft 30. When it is gearing down, the external gear 44 of the spline shaft 41 directly meshes with the teeth 211 of the planetary gear 21. From the internal splines 221 of the planetary gear frame 22 through the splines 403 at the right end of the sliding sleeve 40, power is transmitted to the sliding sleeve 40. The splines 401 at the left end of the sliding sleeve 40 meshes with the splines 32 of the output shaft 30. In this way, power is transmitted from the sliding sleeve 40 toward the output shaft 30 and sent out. It can use this kind of convenient and simple structure to resolve the rapid temperature rise and heat loss situation. It is also a fast and easy way of fitting in the spline shaft 41.

Figure 9:
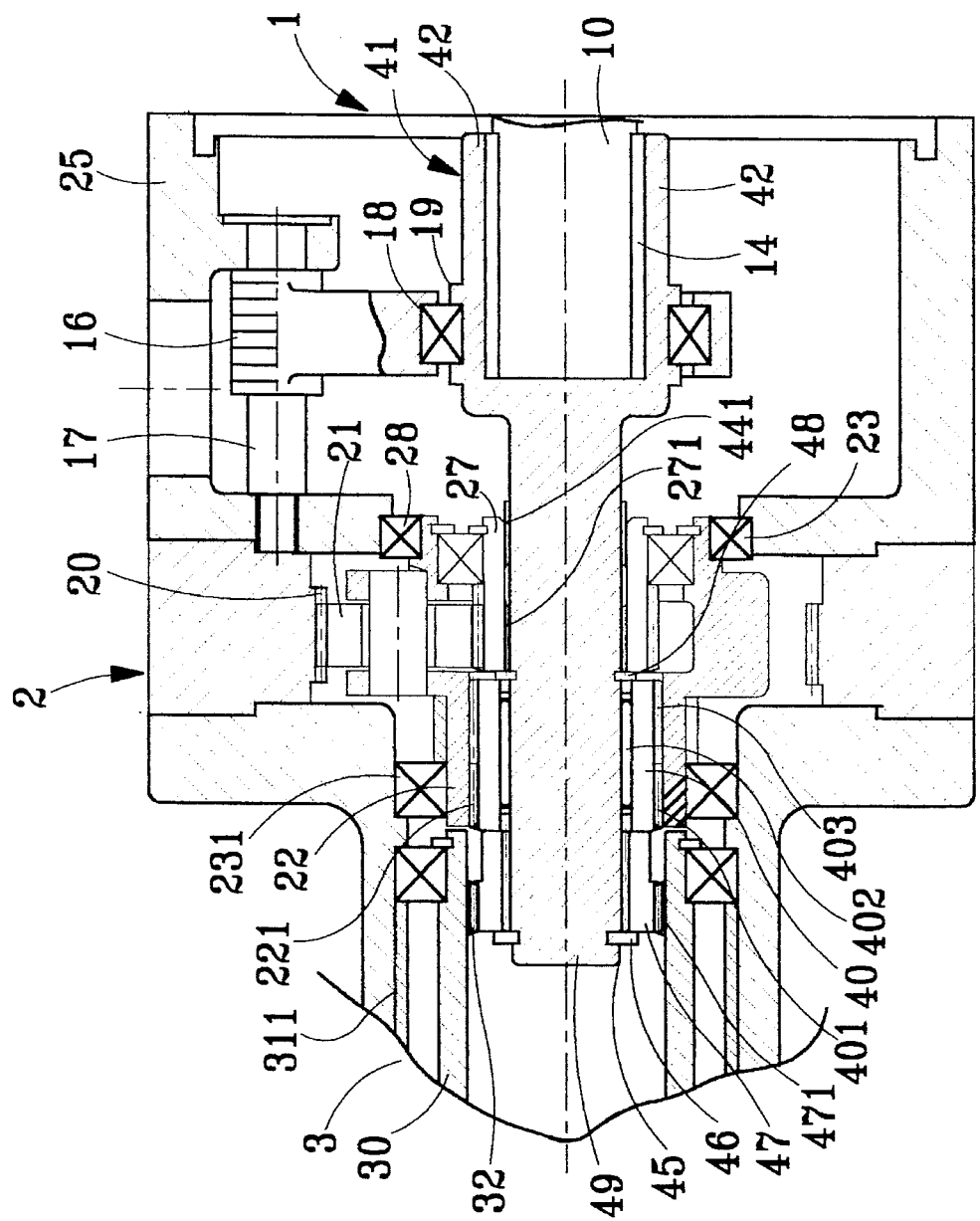
FIG. 9 is the cross-section view in direct transmission of the present invention's third embodiment.
Figure 10:
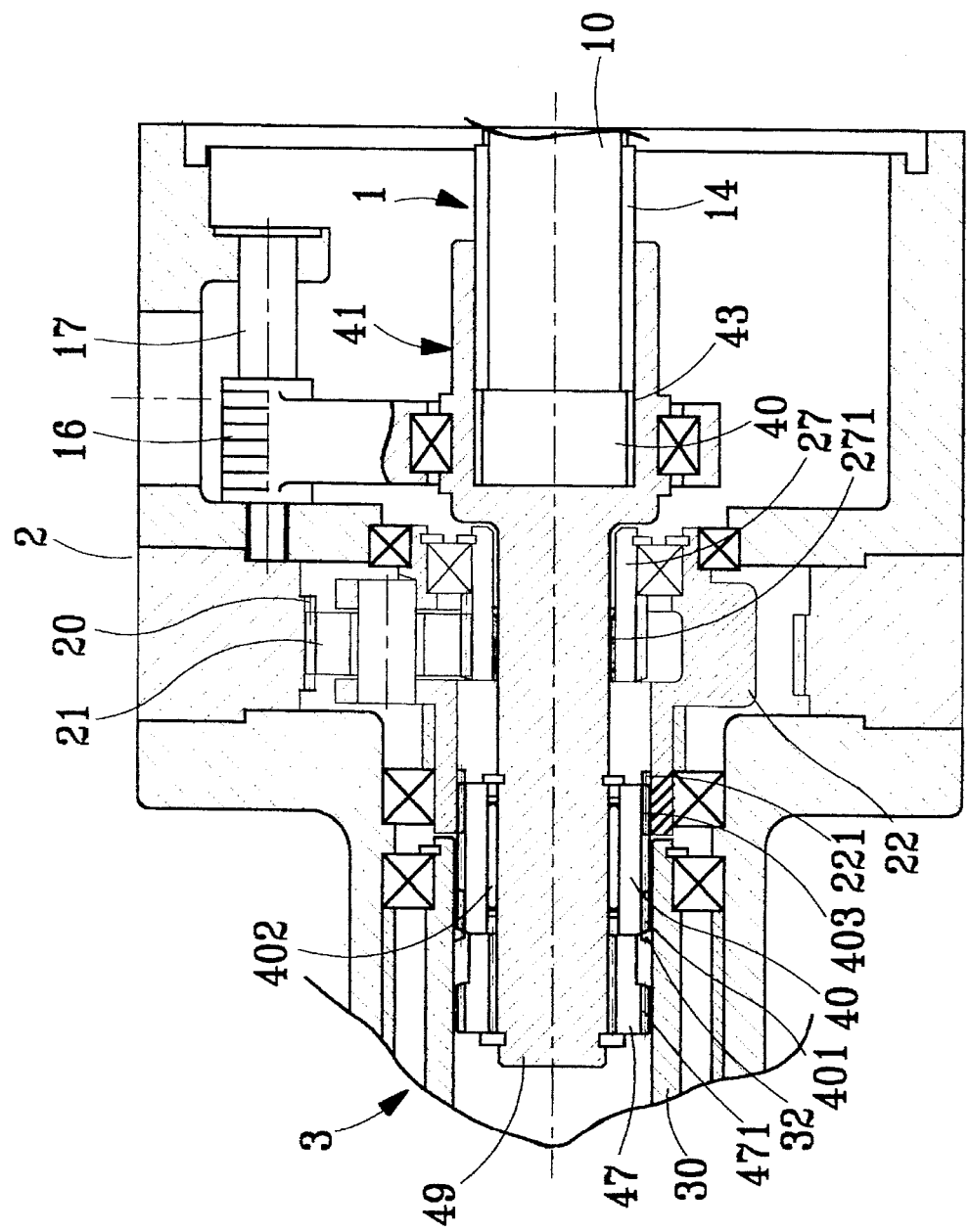
FIG. 10 is the cross-section view in gearing down of the present invention's third embodiment.

The third embodiment of the present invention is shown in FIG. 9 and FIG. 10. Its structural features which combine those of the first and the second embodiments are equipped with the spline shaft 41 and the sliding sleeve 40 mounted on it of the second embodiment, but not equipped with external gear 44. Rather, it is equipped with external splines 441 at the appropriate area on the outside surface to mesh with the internal splines 271 of the sun gear 22 similar to that of the first embodiment. Thereafter, when it is gearing down, power is transmitted from the input shaft 10 through the spline shaft 41 and to the sun gear 22. Through the speed reduction of the sun gear 27 and the planetary gear 21 as well as the annular gear 20, it is transmitted further to the planetary gear frame 22, and by the internal spline 221 of the planetary gear frame 22, transmitted to the sliding sleeve 40 through its right end's splines 403. Power is transmitted from the sliding sleeve 40 with its left end's spline 401 to mesh with the spline 32 of the output shaft 30, toward the output shaft 30 and sent out. When it is in direct transmission, it directly transmits the splines 471 of the driving sleeve 47 to mesh with the splines 32 of the output shaft 30. In this way, power is transmitted from the spline shaft 41 toward the output interchanged usage which fully represents the objective of multi-variation and various discrete embodiments lies in the set up of each pair of splines in various locations. The overall structures are all similar after they are in engagement with one after another and in the course of the transmission they use less annular gears than the prior art which had a relatively larger diameter and are all replaced by the spline shaft with relatively small diameter which greatly lowers the stirring loss, elevates the transmission efficiency and successfully reduces the heat loss, insuring the precision of the machine elements and prolonging the life of its usage.

The embodiments as stated above are used to describe in detail the objectives, features and efficacies of the present invention. To those who are familiar with these kinds of techniques, they may probably change and modify parts of the embodiments according to the foregoing illustrations but these will not be severed themselves from the field of the claims of the present invention.

What is claimed is:

1. A two-speed gearbox for use with a motor comprising:
  (a) a housing;
  (b) an input part, comprising:
    (i) an input shaft which is connected from one end of the motor, said input shaft is provided with external splines;
    (ii) a spline shaft which slides axially and rotates in the same direction as said input shaft and is located at a front end of said input shaft, wherein said spline shaft has a thick first end with a hollow portion provided with internal splines to mesh with said external splines of said input shaft; said spline shaft is also provided with external splines;
  (c) a gear shift mechanism, comprising a gear shift lever, a gear shift bearing, and a slider, wherein said gear shaft lever is inserted from outside into said housing to drive said slider to slide on a fixed rod and, by use of said gear shift bearing, to connect a lower portion of said slider to a lock-in place on an outside surface of said spline shaft so as to drive said spline shaft to slide axially;
  (d) a speed reduction part comprising an annular gear, a planetary gear, a planetary gear frame and a sun gear, wherein said planetary gear frame is fixed to said housing by a pair of first bearings, said planetary gear is positioned to said planetary gear frame through a set of planetary gear shafts, said sun gear is positioned at said planetary gear frame by a second bearing, said planetary gear frame has an inner surface which is provided with internal splines and said sun gear also has an inner surface which is also provided with internal splines; said planetary, gears and said sun gears are connected via a gear reducing means so as to cause a speed ratio to be effectuated;
  (e) an output part comprising an output shaft which is positioned at said housing by a pair of third bearings, said output shaft is provided with internal splines which are meshed with a matching set of external splines of a shaft coupler so as to cause both said output shaft and said shaft coupler to rotate synchronously after meshing and transmit power from said shaft coupler to said output shaft; said shaft coupler is also provided with internal splines;
  (f) first and second position limiters provided on said spline shaft and said shaft coupler, respectively, wherein said first and second position limiters are positioned such that, during a normal operation condition, said spline shaft is stopped by said first position limiters so that a portion of said external splines of said spline shaft are engaged with said internal splines of said shaft coupler to transfer power thereto at a first gear ratio; with an increased force by which said gear shift lever pulls said spline shaft away from said shaft coupler, said first position limiter provided on the spline shaft will stop at said gear shaft beatings such that said external splines of said spline shaft are engaged with nothing, thus causing said gearbox to be at a neutral position; finally, when said gear shift lever pulls the spline shaft further away from said shaft coupler, said first and second position limiters and said gear shift bearing cooperatively cause said external splines of said shaft coupler to be engaged with said internal splines of said planetary gears frame, and said external splines of said spline shaft are to be engaged with said internal splines of said sun gears, so as to transfer power from said spline shaft to said shaft coupler at a second gear ratio.

* * * * *